(12) United States Patent
Ren (10) Patent No.: US 12,330,300 B2
(45) Date of Patent: Jun. 17, 2025

(54) TENDON TRANSMISSION SYSTEM WITH COMPOUND TENDON SHEATH AND TENDON SHEATH CONSTRAINT ELEMENTS

(71) Applicant: NEUROCEAN TECHNOLOGIES INC., Guangdong (CN)

(72) Inventor: Hualong Ren, Guangdong (CN)

(73) Assignee: NEUROCEAN TECHNOLOGIES INC., Guangdong (CN)

( * ) Notice: Subject to any disclaimer, the term of this patent is extended or adjusted under 35 U.S.C. 154(b) by 134 days.

(21) Appl. No.: 17/830,988

(22) Filed: Jun. 2, 2022

(65) Prior Publication Data

US 2022/0288772 A1 Sep. 15, 2022

Related U.S. Application Data

(63) Continuation of application No. PCT/CN2020/133433, filed on Dec. 2, 2020.

(30) Foreign Application Priority Data

Dec. 2, 2019 (CN) .......................... 201911213398.6

(51) Int. Cl.
*B25J 9/10* (2006.01)
*B25J 15/00* (2006.01)

(52) U.S. Cl.
CPC ........... *B25J 9/104* (2013.01); *B25J 15/0009* (2013.01)

(58) Field of Classification Search
CPC ...... B25J 9/0006; B25J 9/104; B25J 15/0009; A61B 34/71
See application file for complete search history.

(56) References Cited

U.S. PATENT DOCUMENTS 5,014,515 A 5/1991 Krauter
2003/0135204 A1* 7/2003 Lee .......................... B25J 9/104
606/1

(Continued)

FOREIGN PATENT DOCUMENTS

CN 201283575 Y 8/2009
CN 105415388 A 3/2016

(Continued)

OTHER PUBLICATIONS

Mxa. (Feb. 14, 2019). Ten things you need to know about Clutch & Throttle Cables. Motocross Action Magazine. https://motocrossactionmag.com/10-things-you-need-to-know-about-clutch-throttle-cables/#google_vignette (Year: 2019).*

(Continued)

*Primary Examiner* — Joseph Brown
(74) *Attorney, Agent, or Firm* — CANTOR COLBURN LLP (57) ABSTRACT

A tendon transmission system with compound tendon sheath and tendon sheath constraint element is provided. The transmission system uses the tendon, tendon sheath and ligament tissue of human hands for reference to propose a compound tendon sheath structure composed of inner tendon sheath and outer tendon sheath, which can effectively reduce the friction between tendon and tendon sheath and prevent tendon lateral shear force from damaging tendon sheath. Type I tendon sheath constraint element, type II tendon sheath constraint element, type III tendon sheath constraint element, and type IV tendon sheath constraint element are proposed. The tendon transmission system can smoothly constrain the position and motion range of the tendon sheath and prevent it from protruding abnormally, can decouple the movement of each joint across the tendon sheath from each other, and can provide a certain curling (Continued)

buffer space for the tendon sheath, a certain compression and impact resistance protection.

19 Claims, 3 Drawing Sheets

(56) References Cited

U.S. PATENT DOCUMENTS

| | | | |
|---|---|---|---|
| 2010/0152898 A1 | 6/2010 | Reiland et al. | |
| 2011/0071664 A1* | 3/2011 | Linn | B25J 9/0006 294/25 |
| 2011/0071678 A1* | 3/2011 | Ihrke | B25J 15/0009 700/258 |
| 2016/0052129 A1* | 2/2016 | Ekas | B25J 9/104 901/21 |
| 2018/0079089 A1* | 3/2018 | Yoshii | B25J 17/02 |
| 2018/0098862 A1 | 4/2018 | Kuiken et al. | |
| 2018/0345481 A1* | 12/2018 | Cho | B25J 9/0006 |

FOREIGN PATENT DOCUMENTS

| | | |
|---|---|---|
| CN | 108621144 A | 10/2018 |
| CN | 110758590 A | 2/2020 |
| CN | 210971345 U | 7/2020 |
| GB | 2472046 A | 1/2011 |
| JP | 2013039656 A | 2/2013 |

OTHER PUBLICATIONS

English Translation of Written Opinion for International Application No. PCT/CN2020/133433; Date of Completion: Feb. 22, 2021; Date of Mailing: Mar. 3, 2021; 5 Pages.

International Search Report for International Application No. PCT/CN2020/133433; Date of Completion: Feb. 3, 2021; Date of Mailing: Mar. 3, 2021; 5 Pages.

Translation of International Search Report for International Application No. PCT/CN2020/133433; Date of Completion: Feb. 3, 2021; Date of Mailing: Mar. 3, 2021; 3 Pages.

Written Opinion for International Application No. PCT/CN2020/133433; Date of Completion: Feb. 22, 2021; Date of Mailing: Mar. 3, 2021; 4 Pages.

* cited by examiner

TENDON TRANSMISSION SYSTEM WITH COMPOUND TENDON SHEATH AND TENDON SHEATH CONSTRAINT ELEMENTS

CROSS-REFERENCE TO RELATED APPLICATION

This application is a continuation application of PCT International Application No. PCT/CN2020/133433 filed on Dec. 2, 2020, which claims the priority to and benefits of Chinese Patent Application No. 201911213398.6 filed on Dec. 2, 2019. The entire contents of the above applications are incorporated herein by reference for all purposes. No new matter has been introduced.

FIELD

This application belongs to the transmission technology field of dexterous hand or bionic mechanical foot, in particular to a tendon transmission system with compound tendon sheaths and tendon sheath constraint elements.

BACKGROUND

The bionic dexterous hand refers to a manipulator whose finger quantity, degrees of freedom, shape, and function are close to human hands. It can flexibly and finely manipulate objects. It is suitable for service robots with high versatility, or for industrial scenarios such as flexible assembly, and as a high performance prosthetics. Bionic mechanical feet refer to the mechanical feet of a biped or quadruped robot, and are mainly used to make the robot walk, run, jump and climb on various grounds and terrains flexibly and smoothly. Bionic dexterous hands and bionic mechanical feet are the key components and devices of bionic robots or humanoid robots. Their common features are their small size and large number of joints. Both need to achieve greater force transmission in a small space through the transmission system. The need for independent control of each joint to achieve high flexibility makes the design of the transmission system extremely challenging.

At present, a transmission method widely used in many dexterous hands (and some mechanical feet) is the tendon transmission. This method transmits the force and motion of the actuator located in the arm or leg to the joints of the hands or feet via the tendon (using steel wire or flexible rope). It can effectively balance the contradiction between the size constraints of the space and the need to transmit large forces. In some schemes, a tendon sheath (or hose) is attached to the outside of the tendon, allowing it to slide axially within the tendon sheath to restrain its movement. However, most of the current tendon transmission schemes still have some inherent problems that are not well solved.

SUMMARY

One of the purposes of the present invention is to provide a tendon transmission system with compound tendon sheaths and tendon sheath constraint elements, aiming at solving the following problems:

The first problem is that there is a large friction between the tendon and tendon sheaths, both of which are prone to wear. Also, because the tendon and the tendon sheaths can be bent, when a large tensile force is applied to make the tendon very tight, the tendon will cause a large internal shear force on the inner wall of the flexural part of the tendon sheaths, which is easy to cut the tendon sheaths.

The second problem is that when the tendon sheaths cross one or more cascaded joints, there needs to be a certain device at the joints to restrict the position, direction and deformation range of the tendon sheaths. The current solutions include two methods. One method is to install gears or pulleys at the joints as relay transmission parts, but this solution causes too many moving parts at the joints, reduces the structural reliability, and occupies a lot of space. Another method is to install rigid semi-enclosed guide rails or groove structures at the joints so as to restrict the tendon sheaths when they move, but the tendon sheaths can be easily detached from the opening side of the groove, and structures such as the rigid groove structure make the tendon sheaths prone to have sharp bending points, which leads to the tendon sheaths are easy to damage.

The third problem is that the motion of each joint spanned by the tendon sheaths need to be decoupled from each other, that is, when one joint moves, it does not affect the motion of other joints. This requires that when one joint moves, it should not affect the tendon sheaths of the other joints, otherwise it will affect the motion of the other joints.

The fourth problem is that the tendon sheath should have a certain curling buffer space, when one or some of the joints through which the tendon sheath passes rotates, the tendon sheath should be able to tighten or relax, in order to adapt to the tendon sheath path changes caused by joint rotation.

The fifth problem is that when the dexterous hand or bionic mechanical foot is under pressure or impact, the transmission system needs to be protected from damage.

In order to solve the above technical problems, the technical scheme adopted in this application is: a tendon transmission system with compound tendon sheaths and tendon sheath constraint elements, comprising: tendons; the compound tendon sheaths; tendon sheath fixing elements; and the tendon sheath constraint elements.

The tendon can be made of a flexible cord (such as a Dyneema PE line) or a steel wire for transferring the driving force of the actuator to the joint.

The compound tendon sheaths comprise at least two layers of tendon sheaths from inside to outside.

A tendon sheath with only one layer is defined as the single-layer tendon sheath.

The compound tendon sheaths or single-layer tendon sheaths have the function of protecting the tendon and restraining the direction and travel of the tendon.

Optionally, the tendon sheath constraint element comprises: a type I tendon sheath constraint element, a type II tendon sheath constraint element, a type III tendon sheath constraint element, and a type IV tendon sheath constraint element.

The type I tendon sheath constraint element is used to restrain the position and deformation range of a small number (not more than 4) of the compound tendon sheaths or single-layer tendon sheath through the joint. When the joints rotate, swing, flex or stretch, the type I tendon sheath constraint element restrains the compound tendon sheaths or single-layer tendon sheaths within the deformation range, prevents the sharp damage of the compound tendon sheaths or single-layer tendon sheaths, and prevents the compound tendon sheaths or single-layer tendon sheaths from coming out of the joint. In addition, when the joints are under pressure or lateral shear, the type I tendon sheath constraint element can effectively protect the compound tendon sheaths or single-layer tendon sheaths.

The type I tendon sheath constraint element is a flexible element, and comprises one or more first guide grooves or first guide holes to guide one to four of the compound tendon sheaths or single-layer tendon sheaths to slide along their respective axes, wherein the type I tendon sheath constraint element is arranged to be installed at interphalangeal joints or metacarpophalangeal joints of a dexterous hand, or toe joints or metatarsophalangeal joints of a bionic mechanical foot, or other robotic joints that are passed/bypassed by at least one but no more than four of the compound tendon sheaths or the single-layer tendon sheaths.

The type II tendon sheath constraint element is used to restrain the position and deformation range of multiple (more than 4) compound tendon sheaths or single-layer tendon sheaths while passing/bypassing the joints, and to provide a certain cushioning buffer space for each compound tendon sheath or single-layer tendon sheaths.

The type II tendon sheath constraint element is a flexible element, and comprises one or more second guide grooves or second guide holes to guide at least five of the compound tendon sheaths or the single-layer tendon sheaths to slide along their respective axes, and a second structure allowing one or more of the compound tendon sheaths or the single-layer tendon sheaths to respectively curl inside the type II tendon sheath constraint element, wherein the type II tendon sheath constraint element is arranged to be installed at wrist joint of the dexterous hand, or ankle joint of the bionic mechanical foot, or the other robotic joints that are passed/bypassed by at least five of the compound tendon sheaths or the single-layer tendon sheaths.

The type III tendon sheath constraint element is used to restrain the position and deformation range of one or more compound tendon sheaths or single-layer tendon sheaths through the bar part (non-hinge part) of the robot joint, and provide a certain cushion space allowing curvature for each compound tendon sheath or single-layer tendon sheath, especially suitable for installation on the palm of a dexterous hand.

The type III tendon sheath constraint element comprises one or more third guide grooves or third guide holes to guide one or more of the compound tendon sheaths or the single-layer tendon sheaths to slide along their respective axes, and a third structure allowing one or more of the compound tendon sheaths or the single-layer tendon sheaths to respectively curl inside the type III tendon sheath constraint element, wherein the type III tendon sheath constraint element is arranged to be installed at palm part or metacarpal of the dexterous hand, or foot part of the bionic mechanical foot, or non-joint parts of other robotic mechanisms.

The type IV tendon sheath constraint element is used for compliantly guiding and restraining the position and deformation range of the compound tendon sheaths or single-layer tendon sheaths through the bar part (non-hinge part) of the robot joint, and avoiding the curvature of the compound tendon sheaths or single-layer tendon sheaths at the bar part (non-hinge part) of the robot joint.

The type IV tendon sheath constraint element comprises one or more fourth guide grooves or fourth guide holes to guide one or more of the compound tendon sheaths or the single-layer tendon sheaths to slide along their respective axes, wherein the type III tendon sheath constraint element is arranged to be installed at phalanges of the dexterous hand, or foot phalanges of the bionic mechanical foot, or the non-hinge parts of the other robotic mechanisms.

A single guide slot or guide hole is able to adopt a specific configuration to guide multiple compound tendon sheaths or single-layer tendon sheaths.

At least one end of the tendons is fixed with an actuator's output shaft or capstan, wherein any point of the tendon is fixed with a rotational part of a driven robot's joint to transmit the actuator's driving force to the driven robot's joint.

One end of the compound tendon sheaths is fixedly connected to the driven robot's joint's joint base through the tendon sheath fixing elements, and the other end of the compound tendon sheaths is fixedly connected to the driven robot's other parts through the tendon sheath fixing elements.

The tendons are configured to slide axially along the compound tendon sheaths in the compound tendon sheaths.

Optionally, each end of the compound tendon sheaths is provided with a respective tendon sheath head to bind each layer of the compound tendon sheaths together, and preventing leakage of the lubricant between the tendon and the innermost tendon sheath.

Optionally, the inner tendon sheath of the compound tendon sheaths adopts a tightly wound spring tube, the material stiffness of which can prevent abrasion or cut by lateral shear force of the tendon. It's capable of side bending, at the same time the tightly wound spring tube cannot be axial compressed so to cause plastic deformation, so it can transmit a large tensile force. The spring tube is preferably made of steel or copper.

Optionally, the outer tendon sheath of the compound tendon sheaths uses a flexible tube with high hardness on the outer surface, which is smooth and wear-resistant, and can be flexibly bent. The outer tendon sheath is sleeved outside the inner tendon sheath to prevent the inner tendon sheath from being excessively bent and damaged, and provides support and protection for the inner tendon sheath when the transmission system is subjected to external lateral shear or compression forces.

Optionally, a gap between the tendon and an innermost layer of the compound tendon sheaths is filled with lubricating fluid.

Optionally, a gap between an outermost layer of the compound tendon sheaths and the type IV tendon sheath constraint element's guide holes is filled with lubricating fluid.

The lubricating fluid is used to reduce friction, heat and noise, as well as provide buffering during high-speed and frequent rotation of robot joints to avoid system resonance.

Optionally, the type I tendon sheath constraint element is a hollow soft sleeve structure, or a structure with one or more connecting bands and two or more fasten rings.

The connecting bands are configured to flexibly connect each fasten ring together.

The type I tendon sheath constraint element is tightened, through the hollow soft sleeve structure or the fasten rings thereof, on the interphalangeal joints or the metacarpophalangeal joints of the dexterous hand, or on the toe joints or the metatarsophalangeal joints of the bionic mechanical foot, or on the other robotic joints that are passed/bypassed by at least one but no more than four of the compound tendon sheaths or the single-layer tendon sheaths.

The type I tendon sheath constraint element's side wall may comprise one or more reinforcing ribs.

Inner walls of the type I tendon sheath constraint element's one or more first guide holes each may comprise an anti-wear layer or an anti-wear sleeve.

Optionally, the type II tendon sheath constraint element is a hollow soft sleeve structure, or a structure with two or more binding rings and one to multiple outer protective sheets and one to multiple inner protective sheets.

The outer protective sheets and the inner protective sheets are configured to flexibly connect each binding ring together.

The type II tendon sheath constraint element is tightened, through the hollow soft sleeve structure or the binding rings thereof, on the wrist joint of the dexterous hand, or on the ankle joint of the bionic mechanical foot, or on the other robotic joints that are passed/bypassed by at least five of the compound tendon sheaths or the single-layer tendon sheaths.

Inner walls of the type II tendon sheath constraint element's one or more second guide holes each may comprise an anti-wear layer or an anti-wear sleeve.

The type II tendon sheath constraint element comprises one to more separators inside.

The outer protective sheets, the separators, and the inner protective sheets are arranged from outside to inside, wherein space between the outer protective sheets, the separators, and the inner protective sheets are configured to separate the compound tendon sheaths or the single-layer tendon sheaths that pass through the space, and to respectively support the compound tendon sheaths or the single-layer tendon sheaths to curl independently, wherein tortuous portion of each of the compound tendon sheaths or the single-layer tendon sheaths does not extend beyond said space. The outer protective sheets are used to restrain the compound tendon sheath or single-layer tendon sheath from extruding outwards, and to protect the compound tendon sheaths or single-layer tendon sheath when the joints are subjected to pressure and tangential force. The inner protective sheets are used to restrain the compound tendon sheath or single layer tendon sheath from protruding inward. The separators are used to separate a plurality of compound tendon sheaths or a single-layer tendon sheaths so as to reduce the interference between them.

Optionally, the type III tendon sheath constraint element comprises two fixing terminals and a cover plate.

The type III tendon sheath constraint element may comprise one to multiple layer-separators inside.

Each fixing point comprises the one or more third guide holes. The two ends of the guide holes can be configured with smooth transition, to prevent the compound tendon sheaths or single-layer tendon sheaths from sharp bending and damage. The inner wall of the guide holes is smooth so that the compound tendon sheaths or single-layer tendon sheaths can pass through it and slide freely along its axis.

The cover plate and each layer-separator are arranged vertically parallel between the two fixing terminals, and space between the cover plate and each layer-separator is configured to separate the compound tendon sheath or the single-layer tendon sheaths that pass through and to support independent curling of the compound tendon sheath or the single-layer tendon sheaths. The cover plate is used to prevent damage from pressure and cutting force acting on the compound tendon sheaths or single-layer tendon sheath. The layer-separators are used to separate the different compound tendon sheaths and the single-layer tendon sheaths into layers, and the compound tendon sheaths or single-layer tendon sheaths can curl in their respective plane space, without interference between each other.

In one embodiment, the type IV tendon sheath constraint element is a hollow soft sleeve structure, and its through hole has the function of guiding hole.

Optionally, the type IV tendon sheath constraint element uses a smooth, abrasion resistant, high-strength and flexible hose in which the compound tendon sheaths or single-layer tendon sheaths can slide freely along the axial direction.

The beneficial effects of the present invention are as follows. The present disclosure provides a tendon transmission system having compound tendon sheaths and tendon sheath constraint elements. The transmission system proposes an inner tendon sheath and an outer tendon sheath with reference to the tendon, tendon sheaths, and ligament tissue of a human hand. The compound tendon sheaths structure can effectively reduce the friction between tendon and tendon sheaths, prevent the lateral shear force of the tendon from damaging the tendon sheath. The present invention also proposes the type I tendon sheath constraint elements, type III tendon sheath constraint elements, type II tendon sheath constraint elements, and type IV tendon sheath constraint elements, which can flexibly restrain the position and range of motion of the tendon sheaths so that they will not protrude abnormally, and decouple the movements of the joints across the tendon sheaths from each other, and provide a certain cushioning buffer space for the tendon sheaths, as well as provide a certain anti-pressure and anti-impact protection. The transmission system has the advantages of simple and reliable structure, certain flexibility, high service life and easy maintenance, etc., and is especially suitable for bionic dexterous hands and bionic mechanical feet.

BRIEF DESCRIPTION OF DRAWINGS

In order to describe the embodiments of the present disclosure more clearly, a brief introduction regarding the accompanying drawings that need to be used for describing the embodiments of the present disclosure or demonstrated technology is given below. It is apparent that the accompanying drawings described below are only some embodiments of the present disclosure, the person of ordinary skill in the art may also obtain other drawings according to these drawings without paying creative effort.

DETAILED DESCRIPTION OF EMBODIMENTS

In order to make the purposes, technical schemes and advantages of this application more clearly, the application is explained in detail in combination with the attached drawings and examples. It should be understood that embodiments described herein are intended only to interpret and not to limit this application.

In order to illustrate the technical solutions of this application, the following combination of the specific drawings and the implementation cases are detailed.

Figure 1:
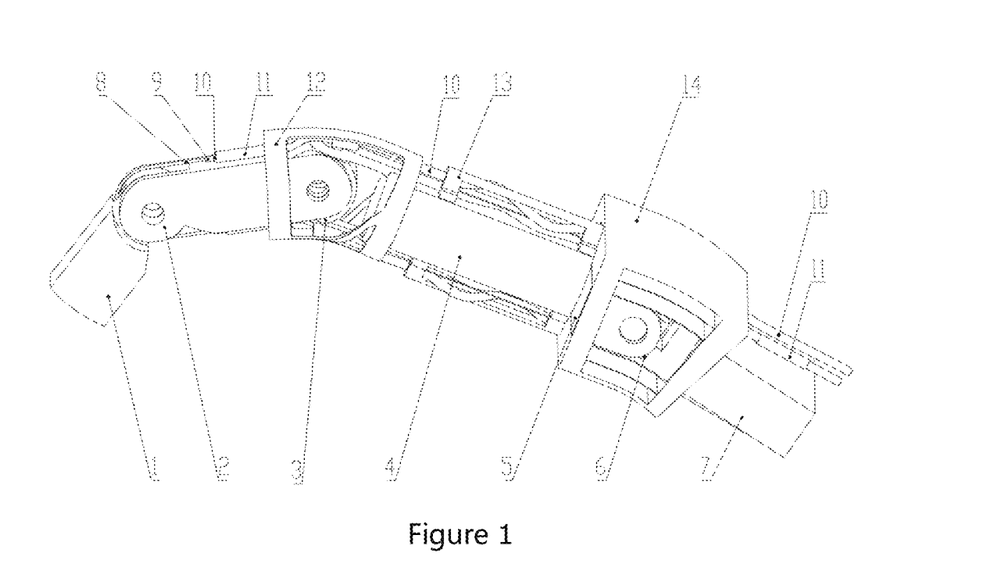
FIG. 1 is the schematic diagram of the overall structure of a tendon transmission system with compound tendon sheath and tendon sheath constraint element provided in this application.
Figure 8:
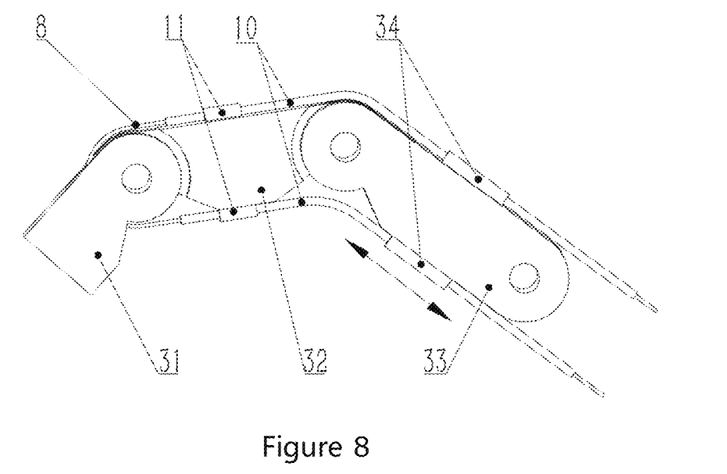
FIG. 8 is a schematic diagram of the installation position of type IV tendon sheath constraint element of a tendon transmission system with compound tendon sheath and tendon sheath constraint element provided in this application.

Referring to FIGS. 1 and 8, the present invention discloses a tendon transmission system with compound tendon sheaths and tendon sheath constraint elements, comprising: tendons 8; the compound tendon sheaths 10; tendon sheath fixing elements 11; and the tendon sheath constraint elements.

The tendon sheath constraint element comprises: a type I tendon sheath constraint element 12, a type II tendon sheath constraint element 14, a type III tendon sheath constraint element 13, and a type IV tendon sheath constraint element 34.

The tendon 8 is made of a flexible cord (such as a Dyneema PE line) or a steel wire rope for transferring the driving force of the actuator to the joint.

At least one end of the tendons 8 is fixed with an actuator's output shaft or capstan. Any point of the tendon 8 is fixed with a rotational end of a driven robot's joint (such as the interphalangeal joint's rotational end 1) to transmit the actuator's driving force to the driven robot's joint.

Figure 2:
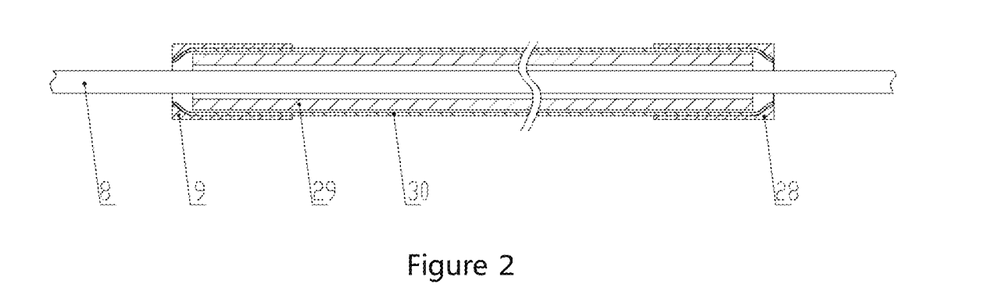
FIG. 2 is the schematic diagram of a compound tendon sheath half-section of tendon transmission system with compound tendon sheath and tendon sheath constraint element provided in this application.

Referring to FIGS. 1 and 2, the compound tendon sheaths 10 comprise at least two layers of tendon sheaths from inside to outside.

A tendon sheath with only one layer is defined as the single-layer tendon sheath.

The compound tendon sheaths 10 or single-layer tendon sheaths have the function of protecting the tendon 8 and restraining the direction and travel of the tendon 8.

Figure 5:
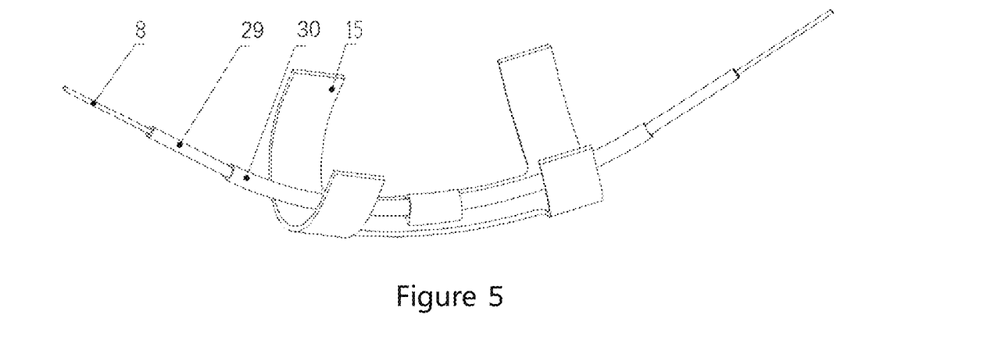
FIG. 5 is the semi-sectional structure diagram of type I tendon sheath constraint element of tendon transmission system with compound tendon sheath and tendon sheath constraint element provided in this application.

Referring to FIGS. 2 and 5, in one embodiment of the present application, the compound tendon sheaths 10 comprise inner tendon sheath 29, outer tendon sheath 30 and tendon sheath head 9.

The inner tendon sheath 29 allows the tendon 8 to slide freely in it along its axis. The inner tendon sheath 29 adopts a tightly wound spring tube, the material stiffness of which can prevent abrasion or cut by lateral shear force of the tendon 8. It's capable of side bending, at the same time the tightly wound spring tube cannot be axial compressed so to cause plastic deformation, so it can transmit a large tensile force. The spring tube is preferably made of steel or copper.

The outer tendon sheath 30 of the compound tendon sheaths uses a flexible tube with high hardness on the outer surface, which is smooth and wear-resistant, and can be flexibly bent. The outer tendon sheath is sleeved outside the inner tendon sheath 29 to prevent the inner tendon sheath from being excessively bent and damaged, and provides support and protection for the inner tendon sheath 29 when the transmission system is subjected to external lateral shear or compression forces.

The gap between the tendon 8 and an inner tendon sheath 29 is filled with lubricating fluid. The lubricating fluid is used to reduce friction, heat and noise, as well as provide buffering during high-speed and frequent rotation of robot joints to avoid system resonance.

The ends of the compound tendon sheaths 10 are provided with the tendon sheath head 9 to bind the inner tendon sheath 29 and the outer tendon sheath 30 together, and preventing leakage of the lubricating fluid between the tendon 8 and the inner tendon sheath 29.

Referring to FIGS. 1 and 2, the tendon sheath fixing element 11 can be matched with the tendon sheath head 9, such as tightening the tendon sheath fixing element 11 on the outer surface of the tendon sheath head 9. One end of the compound tendon sheath 10 is fixed with the joint base of the driven robot joint by the tendon sheath fixing element 11 (interphalangeal joint base 2 as shown in FIG. 1), and the other end of the compound tendon sheath 10 can be fixed with the wrist joint base 7 or the forearm's tendon sheath guide base or the actuator mounting base.

Figure 3:
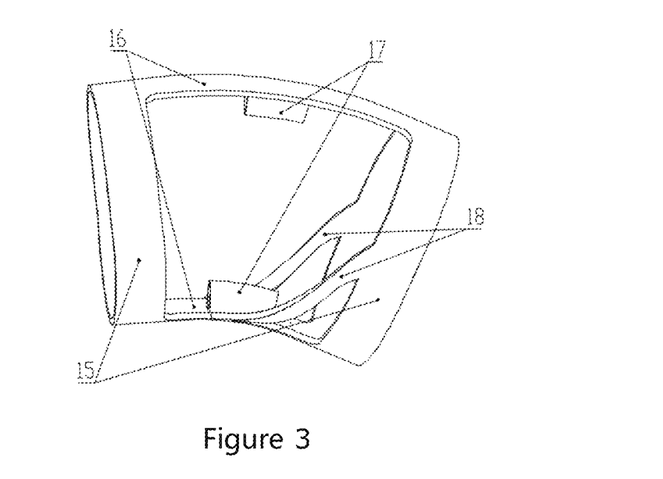
FIG. 3 is a schematic diagram of type I tendon sheath constraint element with oblique reinforcing ribs in a tendon transmission system with compound tendon sheath and tendon sheath constraint element provided in this application.
Figure 4:
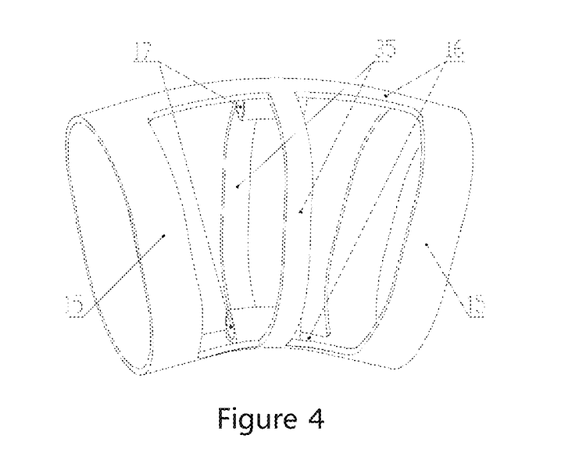
FIG. 4 is the schematic diagram of type I tendon sheath constraint element with vertical reinforcing ribs of a tendon transmission system with compound tendon sheath and tendon sheath constraint element provided in this application.

Referring to FIGS. 3, 4 and 5, the type I tendon sheath constraint element 12 has a hollow sleeve structure, with two fasten rings 15 and two connecting bands 16. It has one or more type I guide holes 17 inside or outside, and the compound tendon sheaths 10 or single-layer tendon sheaths pass through the type I guide holes 17 and can slide freely along the axis of the type I guide holes 17.

The type I tendon sheath constraint element 12 is a flexible element that can be bent, which can be made of rubber or silica gel and other materials. The side wall of the type I tendon sheath constraint element can be provided with diagonal reinforcing ribs 18 (see FIG. 3) or vertical reinforcing ribs 35 (see FIG. 4), which are used to constrain the position and deformation range of compound tendon sheaths 10 or single-layer tendon sheaths that pass/bypass the joints. When the joint rotates, abducts/adducts, flexes or extends, the type I tendon sheath constraint element 12 will restrain the compound tendon sheaths 10 or single-layer tendon sheaths within the deformation range, prevent the compound tendon sheath 10 or single-layer tendon sheaths from sharp bending and damage, and prevent the compound tendon sheaths 10 or single-layer tendon sheaths to come out of the joints. In addition, the type I tendon sheath constraint element 12 can effectively protect the compound tendon sheath 10 or the single-layer tendon sheaths when the joints are subjected to pressure or lateral shear force.

Referring to FIG. 1, the type I tendon sheath constraint element 12 is arranged to be installed at interphalangeal joints (composed of the interphalangeal joint base 2 and the rotational end 1) or metacarpophalangeal joints of a dexterous hand, or toe joints or metatarsophalangeal joints of a bionic mechanical foot, or other robotic joints that are passed/bypassed by at least one but no more than four of the compound tendon sheaths 10 or the single-layer tendon sheaths.

FIG. 1 of this embodiment only shows a dexterous finger composed of two phalanges, and shows the scenario where the type I tendon sheath constraint element 12 is installed at metacarpophalangeal joint 3. In practical application, the type I tendon sheath constraint element 12 can be applied to dexterous hands with multiple fingers (each finger includes multiple phalanges) and each phalange of each finger or metacarpophalangeal joint 3.

Figure 6:
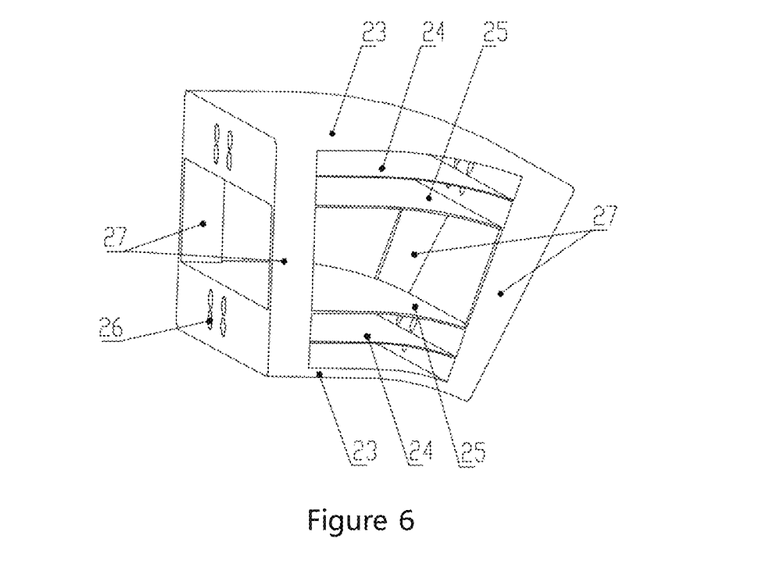
FIG. 6 is a schematic diagram of type II tendon sheath constraint element of a tendon transmission system with compound tendon sheath and tendon sheath constraint element provided in this application.

Referring to FIGS. 1 and 6, the type II tendon sheath constraint element 14 is a flexible element that can be bent and can be made of rubber or silica gel. The type II tendon sheath constraint element 14 has 1 binding ring 27 on both sides (front and back), two or more outer protective sheets 23, two or more inner protective sheets 25, and one or more separators 24, which are used to constrain the position and deformation range of multiple compound tendon sheaths 10 or single-layer tendon sheaths while passing/bypassing the joints, and to provide a certain curling buffer space for each compound tendon sheath 10 or single-layer tendon sheath.

The binding rings 27 each has one or more type II guide holes 26. The inner wall of the type II guide hole 26 has an anti-wear layer, and the compound tendon sheath 10 or single-layer tendon sheaths pass through the type IV tendon sheath constraint element 34 and can slide freely along its axis. The binding ring 27 is provided with a mounting interface for matching with the robot joint (such as wrist joint 6). For example, one binding ring 27 of the type II tendon sheath constraint element 14 can be set at the rotational end of the wrist joint 5 and another binding ring 27 can be set at the wrist joint base 7.

The outer protective sheets 23 are used to restrain the compound tendon sheaths 10 or single-layer tendon sheaths from extruding outwards, and to protect the compound tendon sheaths or single-layer tendon sheaths when the joints are subjected to pressure and tangential force.

The inner protective sheets 25 are used to restrain the compound tendon sheaths 10 or single-layer tendon sheaths from protruding inward.

The separators 24 are used to separate a plurality of compound tendon sheaths 10 or a single-layer tendon sheaths so as to reduce the interference between them.

The space between the outer protective sheets 23, the separators 24 and the inner protective sheets 25 provides a curling buffer space for each compound tendon sheath 10 or single-layer tendon sheaths.

The cross section of type II tendon sheath constraint element 14 shown in FIGS. 1 and 6 of this embodiment is rectangular. In practical application, the shape of the type II tendon sheath constraint element 14 can also be adjusted according to the shape of the joints, such as making the cross-section oval.

Referring to FIG. 1, the type II tendon sheath constraint element 14 is arranged to be installed at wrist joint 6 of the dexterous hand, or ankle joint of the bionic mechanical foot, or the other robotic joints that are passed/bypassed by at least five of the compound tendon sheaths or the single-layer tendon sheaths.

Figure 7:
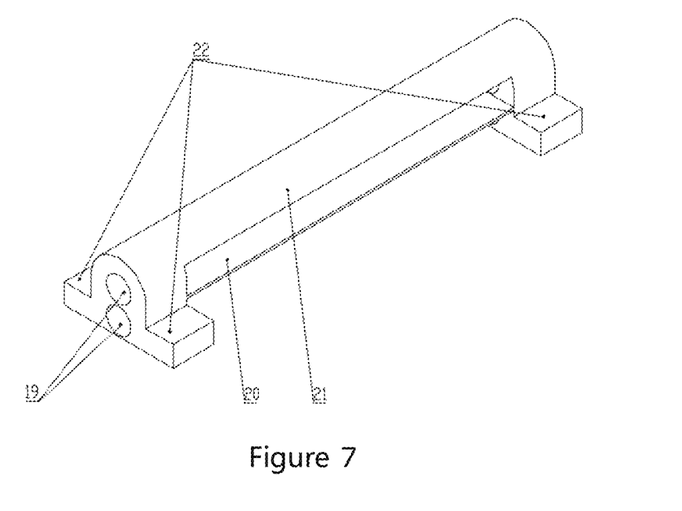
FIG. 7 is a schematic diagram of type III tendon sheath constraint element of a tendon transmission system with compound tendon sheath and tendon sheath constraint element provided for this application.

Referring to FIGS. 1 and 7, the type III tendon sheath constraint element 13 is made of flexible material or non-flexible material, and comprises two fixing terminals 22, a cover plate 21 and one to multiple layer-separators 20 to constrain position and deformation range of the one or more compound tendon sheaths 10 or single-layer tendon sheaths that bypass the bar part of the robot joint (such as metacarpal phalanges), and provide a certain curling buffer space for each compound tendon sheath 10 or single-layer tendon sheath.

The fixing terminals 22 each has one or more type III guide holes 19. The inner wall of the type III guide holes 19 is smooth so that the compound tendon sheaths 10 or single-layer tendon sheaths can pass through it and slide freely along its axis. The type III guide holes 19 have a smooth transition at both ends, preventing the compound tendon sheaths 10 or single-layer tendon sheaths from being damaged by sharp bending. The fixing end 22 can be fixed to the bar part of the robot joint (such as metacarpal phalange 4) by screws, buckles, and pastes.

The cover plate 21 is used to prevent damage caused by pressure and cutting force acting on the compound tendon sheaths 10 or single-layer tendon sheaths.

The layer-separators 20 are used to separate the different compound tendon sheaths 10 and the single-layer tendon sheaths into layers, and each compound tendon sheath 10 or single-layer tendon sheaths can curl in their respective plane space. The curvature portion of the compound tendon sheath 10 or single-layer tendon sheaths is located inside the type III tendon sheath constraint element 13 and convex to both sides, without interference between each other.

Referring to FIG. 1, the type III tendon sheath constraint element 13 is configured to be mounted on the metacarpal phalange 4 of the dexterous hand, or foot part of the bionic mechanical foot, or other non-joint parts.

Referring to FIG. 8, one implementation method is that the type IV tendon sheath constraint element 34 adopts a flexible hose with smooth inner wall and anti-wear resistance, high strength, and can be bent. The through hole enables the compound tendon sheaths 10 or single-layer tendon sheaths to slide freely along the axis, which is used to guide and restrain the direction of the compound tendon sheath 10 or single-layer tendon sheath smoothly.

The finger shown in FIG. 8 is composed of sequentially articulated distal finger phalange 31, middle finger phalange 32 and proximal finger phalange 33. The hand back side and hand palm side of the middle finger phalange 32 were respectively connected with a compound tendon sheath 10 by a tendon sheath fixing element 11. The type IV tendon sheath constraint element 34 is respectively arranged on the hand back side of the hand and hand palm side of the hand near the proximal finger phalange 33. A point in the middle of tendon 8 is fixedly connected to the rotational end of the distal finger phalange 31 and can slide axially in the compound tendon sheath 10. The compound tendon sheath 10 can slide in the type IV tendon sheath constraint element 34.

A gap between an outermost layer of the compound tendon sheaths 10 and the type IV tendon sheath constraint element 34 is filled with lubricating fluid. The lubricating fluid is used to reduce friction, heat and noise, as well as provide buffering during high-speed and frequent rotation of robot joints to avoid system resonance.

The above are only optional embodiments of this application and are not intended to limit this application. This application is subject to various changes and variations for those skilled in the field. Any modification, equivalent replacement, improvement etc. made in the spirit and principle of this application shall be included in the scope of claims of this application.

What is claimed is:

1. A tendon transmission system, comprising:
   tendons;
   compound tendon sheaths for the tendons, each of the compound tendon sheaths include an inner tendon sheath and an outer tendon sheath, the inner tendon sheath is located within the outer tendon sheath and the inner tendon sheath is configured to enable a respective one of the tendons to slide along an axial direction within the inner tendon sheath and a gap between the inner tendon sheath and the respective one of the tendons is filled with a lubricating fluid, wherein each end of the compound tendon sheaths is provided with a respective tendon sheath head to bind the inner tendon sheath and the outer tendon sheath together in order to prevent the lubricating fluid from leaking from the gap;
   tendon sheath fixing elements, wherein a respective one of the tendon sheath fixing elements is secured to the respective tendon sheath head of one end of each of the compound tendon sheaths; and
   tendon sheath constraint elements, wherein the tendon sheath constraint elements each comprises one or more guide grooves or guide holes to guide one or more of the compound tendon sheaths to slide along their respective axes, and wherein the tendons are configured to transmit an actuator's driving force to a driven robot's joint.

2. The tendon transmission system as in claim 1, wherein the tendon sheath constraint elements comprise a type I tendon sheath constraint element, wherein the type I tendon sheath constraint element is a flexible element.

3. The tendon transmission system as in claim 2, wherein the type I tendon sheath constraint element is a hollow soft sleeve structure, or the type I tendon sheath constraint element has a hollow soft sleeve structure through which the type I tendon sheath constraint element passes, with one or more connecting bands and two or more fasten rings, wherein the one or more connecting bands are configured to flexibly connect each of the two or more fasten rings together.

4. The tendon transmission system as in claim 3, wherein a side wall of the type I tendon sheath constraint element comprises one or more reinforcing ribs.

5. The tendon transmission system as in claim 2, wherein inner walls of the guide holes each comprises an anti-wear layer or an anti-wear sleeve.

6. The tendon transmission system as in claim 2, wherein the one or more guide grooves or guide holes guide one to four of the compound tendon sheaths to slide along their respective axes, wherein the type I tendon sheath constraint element is arranged to be installed at interphalangeal joints or metacarpophalangeal joints of a dexterous hand, or toe joints or metatarsophalangeal joints of a bionic mechanical foot, or other robotic joints that are passed/bypassed by at least one but no more than four of the compound tendon sheaths.

7. The tendon transmission system as in claim 1, wherein the tendon sheath constraint elements comprise a type II tendon sheath constraint element, which comprises a second structure allowing one or more of the compound tendon sheaths to respectively curl inside the type II tendon sheath constraint element and the type II tendon sheath constraint element is a flexible element, and the one or more guide grooves or guide holes guide at least five of the compound tendon sheaths to slide along their respective axes, wherein the type II tendon sheath constraint element is arranged to be installed at a wrist joint of a dexterous hand, or an ankle joint of a bionic mechanical foot, or other robotic joints that are passed/bypassed by at least five of the compound tendon sheaths.

8. The tendon transmission system as in claim 7, wherein the type II tendon sheath constraint element is a hollow soft sleeve structure, or a structure with two or more binding rings and one to multiple outer protective sheets and one to multiple inner protective sheets, wherein the one to multiple outer protective sheets and the one to multiple inner protective sheets are configured to flexibly connect each of the two or more binding rings together.

9. The tendon transmission system as in claim 8, wherein the type II tendon sheath constraint element comprises one to more separators inside, wherein the one to multiple outer protective sheets, the one to more separators, and the one to multiple inner protective sheets are arranged from outside to inside, wherein space between the one to multiple outer protective sheets, the one to more separators, and the one to multiple inner protective sheets are configured to separate the compound tendon sheaths that pass through the space, and to respectively support the compound tendon sheaths to curl independently.

10. The tendon transmission system as in claim 8, wherein inner walls of the type II tendon sheath constraint element's one or more guide holes each comprises an anti-wear layer or an anti-wear sleeve.

11. The tendon transmission system as in claim 1, wherein the tendon sheath constraint elements comprise a type III tendon sheath constraint element, which comprises a third structure allowing one or more of the compound tendon sheaths to respectively curl inside the type III tendon sheath constraint element.

12. The tendon transmission system as in claim 11, wherein the type III tendon sheath constraint element is arranged to be installed at a palm part or metacarpal of a dexterous hand, or a foot part of a bionic mechanical foot, or non-joint parts of other robotic mechanisms.

13. The tendon transmission system as in claim 11, wherein the type III tendon sheath constraint element comprises two fixing terminals and a cover plate, wherein the type III tendon sheath constraint element comprises one to multiple layer-separators inside, wherein each of the two fixing terminals comprises the guide holes, wherein the cover plate and each of the one to multiple layer-separators are arranged vertically parallel between the two fixing terminals, and space between the cover plate and each of the one to multiple layer-separators is configured to separate each layer of the one or more compound tendon sheath that pass through the space into layers and to support independent curling of the one or more compound tendon sheaths.

14. The tendon transmission system as in claim 1, wherein the tendon sheath constraint elements comprise a type IV tendon sheath constraint element, wherein the type IV tendon sheath constraint element is a hollow soft sleeve structure.

15. The tendon transmission system as in claim 14, wherein the type IV tendon sheath constraint element is arranged to be installed at phalanges of a dexterous hand, or foot phalanges of a bionic mechanical foot, or non-joint parts of other robotic mechanisms.

16. The tendon transmission system as in claim 14, wherein a gap between an outermost layer of the compound tendon sheaths and the type IV tendon sheath constraint element's guide holes is filled with lubricating fluid.

17. The tendon transmission system as in claim 1, wherein at least one end of each of the tendons is fixed with an actuator's output shaft or capstan, and wherein any point of each one of the tendons is fixed with a rotational part of a driven robot's joint to transmit the actuator's driving force to the driven robot's joint.

18. The tendon transmission system as in claim 1, wherein the inner tendon sheath adopts a wound spring tube, wherein the outer tendon sheath is a flexible tube.

19. The tendon transmission system as in claim 1, wherein the respective one of the tendon sheath fixing elements is secured to an outer surface of the respective tendon sheath head of the one end of each of the compound tendon sheaths.

* * * * *